United States Patent
Shen et al.

(10) Patent No.: US 11,583,056 B2
(45) Date of Patent: Feb. 21, 2023

(54) REPLACEABLE COSMETIC BOTTLE

(71) Applicant: APR Beauty Group Inc., Toronto (CA)

(72) Inventors: Jun Shen, New Westminster (CA); Min-Yan Zheng, Richmond Hill (CA); Fengying Fu, Markham (CA)

(73) Assignee: APR BEAUTY GROUP INC., Toronto (CA)

( * ) Notice: Subject to any disclaimer, the term of this patent is extended or adjusted under 35 U.S.C. 154(b) by 383 days.

(21) Appl. No.: 16/797,191

(22) Filed: Feb. 21, 2020

(65) Prior Publication Data
US 2021/0259389 A1 Aug. 26, 2021

(51) Int. Cl.
| | |
|---|---|
| *A45D 40/00* | (2006.01) |
| *B65D 77/04* | (2006.01) |
| *B65D 23/08* | (2006.01) |
| *A47J 41/00* | (2006.01) |
| *B65D 43/02* | (2006.01) |

(52) U.S. Cl.
CPC ...... *A45D 40/0068* (2013.01); *A47J 41/0077* (2013.01); *B65D 23/0885* (2013.01); *B65D 77/0493* (2013.01); *A45D 2040/0006* (2013.01); *A45D 2200/05* (2013.01); *B65D 43/0231* (2013.01); *B65D 2251/0015* (2013.01); *B65D 2251/0018* (2013.01); *B65D 2251/0081* (2013.01); *B65D 2543/00805* (2013.01)

(58) Field of Classification Search
CPC ............. A45D 40/0068; A47J 41/0077; B65D 43/0231; B65D 2251/0015; B65D 2251/0078; B65D 2251/0018; B65D 2251/0081; B65D 2543/00805
USPC ......... 220/23.87, 23.83, 23.86, 23.89, 259.3, 220/259.4, 288, 521, 523, 786, 787; 215/6, 44
See application file for complete search history.

(56) References Cited

U.S. PATENT DOCUMENTS

| | | | | |
|---|---|---|---|---|
| 1,198,948 A | * | 9/1916 | Newton | B65D 50/04 215/218 |
| 3,156,279 A | * | 11/1964 | Grebowiec | B65D 11/16 215/44 |
| 3,265,233 A | * | 8/1966 | Tuuri | B65D 50/067 222/545 |
| 3,311,248 A | * | 3/1967 | Marchant | A45D 40/0068 D7/608 |
| 3,550,803 A | * | 12/1970 | Pierre | A45D 40/0068 215/12.1 |

(Continued)

*Primary Examiner* — James N Smalley

(57) ABSTRACT

The present utility model discloses a replaceable cosmetic bottle, comprising a bottle body and a bottle cap that covers the bottle body, wherein the bottle body comprises an outer bottle and an inner container which are detachably connected; the outer bottle comprises a first threaded connection portion and a second threaded connection portion which are vertically connected, and the second threaded connection portion is in threaded connection with the bottle cap; the inner container comprises a vertical ring boss; and the inner container is arranged in an inner cavity of the outer bottle, and the vertical ring boss is in threaded connection with the first threaded connection portion. According to the present utility model, the inner container can be conveniently replaced, thereby effectively saving costs and conforming to the idea of energy conservation and environmental protection.

4 Claims, 5 Drawing Sheets

(56) References Cited

U.S. PATENT DOCUMENTS

| | | | | |
|---|---|---|---|---|
| 3,630,403 | A | * | 12/1971 | Berg ................... B65D 50/064 215/221 |
| 4,206,842 | A | * | 6/1980 | Burridge, Jr. .......... B65D 85/00 220/DIG. 13 |
| 4,429,798 | A | * | 2/1984 | Borows ................ B65D 41/045 215/12.1 |
| 8,763,835 | B2 | * | 7/2014 | Tirone ................... A23G 9/28 426/115 |
| 10,399,743 | B1 | * | 9/2019 | Loritz .................... B65D 51/18 |
| 2008/0202950 | A1 | * | 8/2008 | Anderson .......... B65D 51/2842 215/11.1 |
| 2011/0163102 | A1 | * | 7/2011 | Haynie ................ B65D 51/28 220/521 |

* cited by examiner

REPLACEABLE COSMETIC BOTTLE

TECHNICAL FIELD

The present utility model relates to the technical field of cosmetic packaging, and in particular to a replaceable cosmetic bottle.

BACKGROUND ART

With the improvement of people's living standards, the majority of ladies pay more and more attention to their appearance and are keen on making themselves look more perfect with makeup. In a cosmetic bottle in the existing market, an outer bottle and an inner container are typically of a structure that is inconvenient to be disassembled or cannot be disassembled, and after the cosmetic is used up, the cosmetic bottle is directly discarded, which causes great waste of resources and is not environmentally friendly.

SUMMARY OF THE UTILITY MODEL

An object of the present utility model is, in order to overcome the deficiency in the prior art mentioned above, to provide a replaceable cosmetic bottle, in which an inner container can be conveniently replaced, thereby effectively saving costs and conforming to the idea of energy conservation and environmental protection.

In order to achieve the above object, the present utility model uses the following technical solution:

a replaceable cosmetic bottle, comprising an outer bottle, an inner container and a bottle cap, wherein the outer bottle comprises a first threaded connection portion and a second threaded connection portion which are disposed on an upper portion of the outer bottle, with the outer diameter of the first threaded connection portion being less than that of the second threaded connection portion; the second threaded connection portion is in threaded connection with the bottle cap; the inner container comprises a vertical ring boss, and the vertical ring boss is in threaded connection with the first threaded connection portion; and the outer bottle is fitted to the bottle cap to enclose the inner container.

The inner container further comprises a main accommodation body for holding a cosmetic, a horizontal ring boss formed by horizontally extending outward from an upper end of the main accommodation body, and a flip cap integrally formed with the main accommodation body for covering the main accommodation body, with an outer edge of the horizontal ring boss vertically extending downward to form a vertical ring boss.

The flip cap is connected to one side of the horizontal ring boss.

An inner annular wall of the vertical ring boss is provided with a ring boss inner screw thread, and an outer annular wall of the first screw connection portion is provided with a first outer screw thread that is fitted in threaded connection with the ring boss inner screw thread.

The middle of one end surface of the flip cap is provided with a convex ring, convex retainers are circumferentially and uniformly distributed on an outer annular wall of the convex ring, an inner wall of an upper portion of the main accommodation body is recessed to form a retainer ring slot, and the flip cap is turned over such that the convex retainers are fitted and retained into the retainer ring slot.

An inner annular wall of a lower portion of the bottle cap is provided with a bottle cap inner screw thread, and an outer annular wall of the second threaded connection portion is provided with a second outer screw thread that is fitted in threaded connection with the bottle cap inner screw thread.

The present utility model has the beneficial effect in that the inner container is in threaded connection with the outer bottle, by which the inner container can be conveniently replaced, thereby saving costs, reducing the waste of resources, and conforming to the current social development idea of energy conservation and environmental protection.

Figure 1:
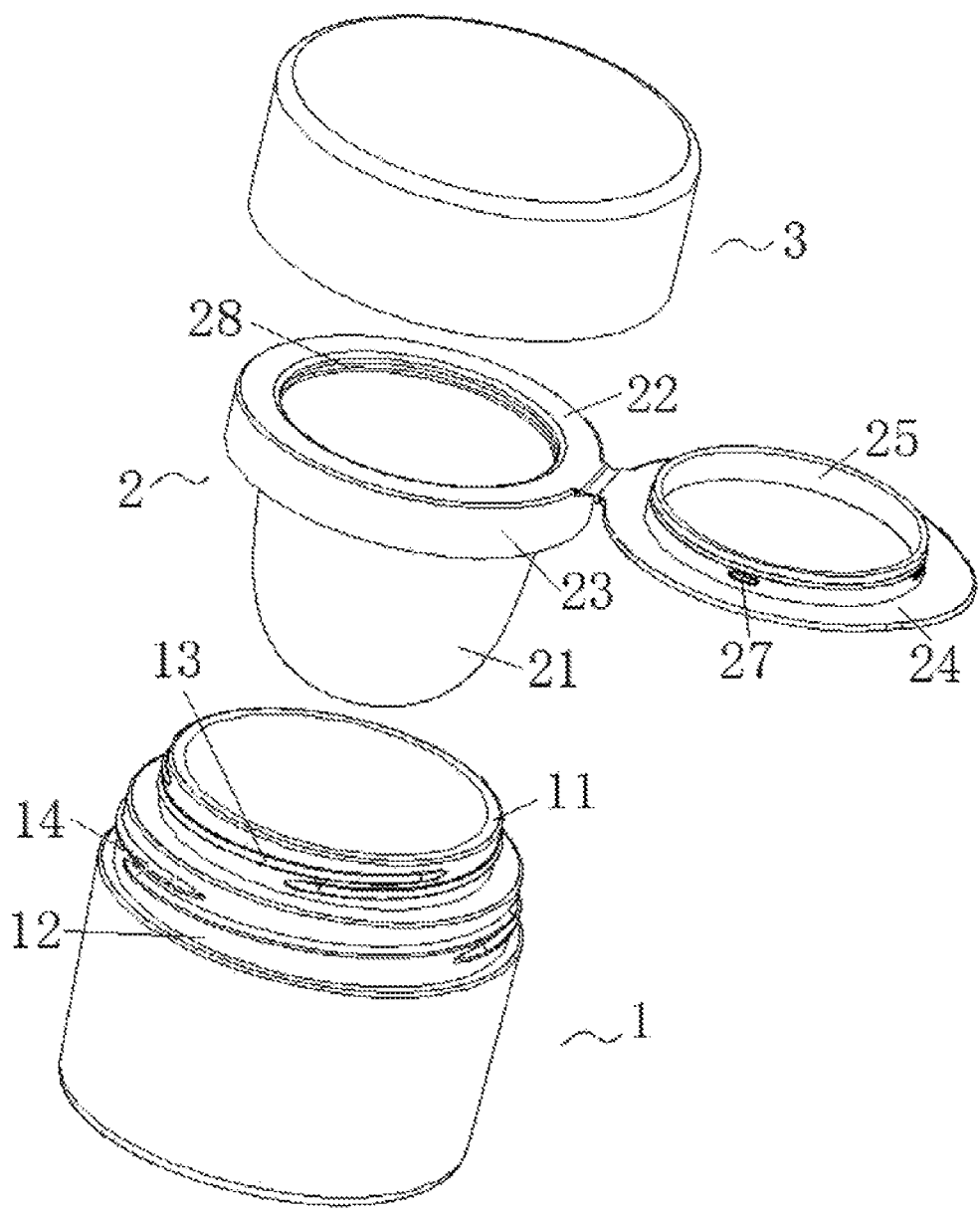
FIG. 1 is an exploded schematic diagram in a first view of the present utility model.

In the figures: outer bottle 1, first threaded connection portion 11, second threaded connection portion 12, first outer screw thread 13, second outer screw thread 14, inner container 2, main accommodation body 21, horizontal ring boss 22, vertical ring boss 23, flip cap 24, convex ring 25, ring boss inner screw thread 26, convex retainer 27, retainer ring slot 28, bottle cap 3, and bottle cap inner screw thread 31.

DETAILED DESCRIPTION OF EMBODIMENTS

The present utility model will be further described below in conjunction with the accompanying drawings and particular embodiments.

Figure 2:
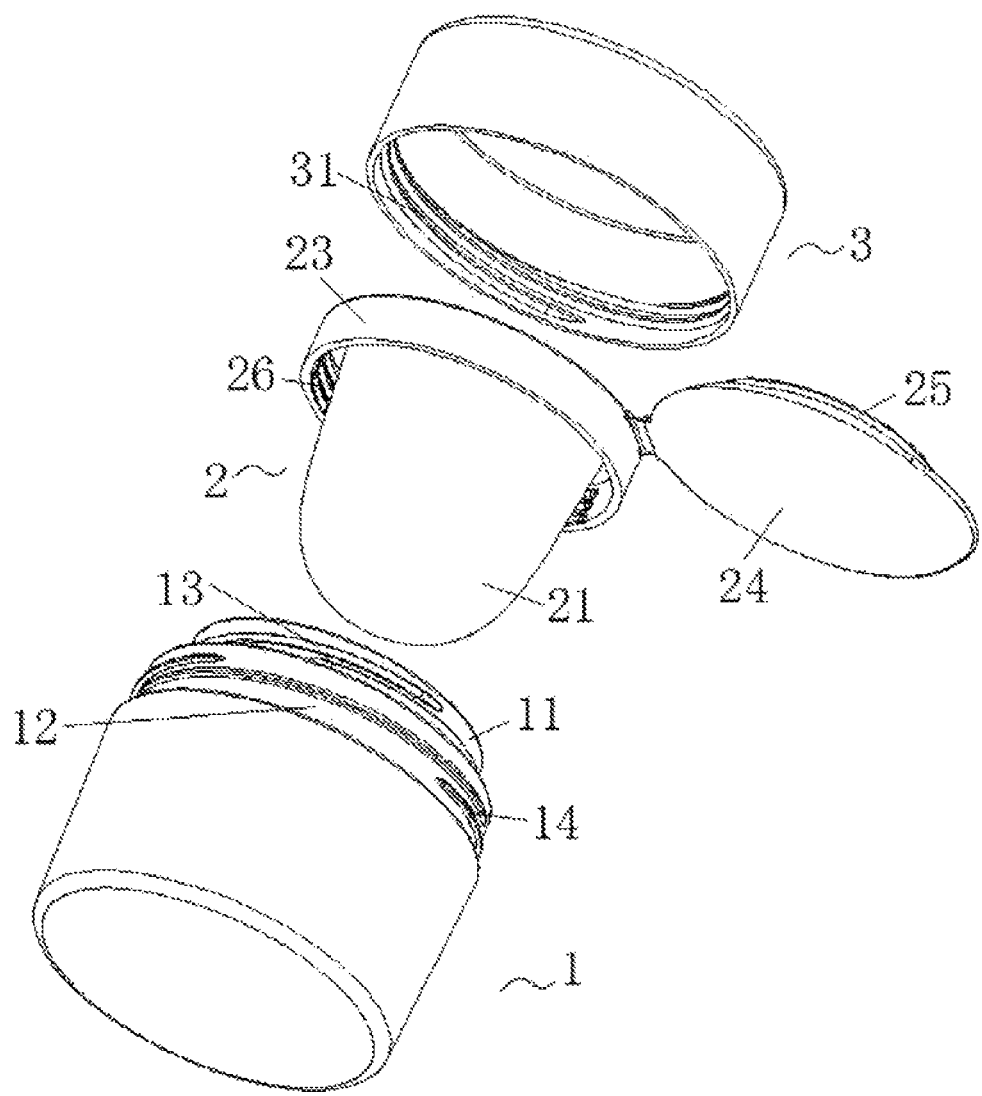
FIG. 2 is an exploded schematic diagram in a second view of the present utility model.
Figure 3:
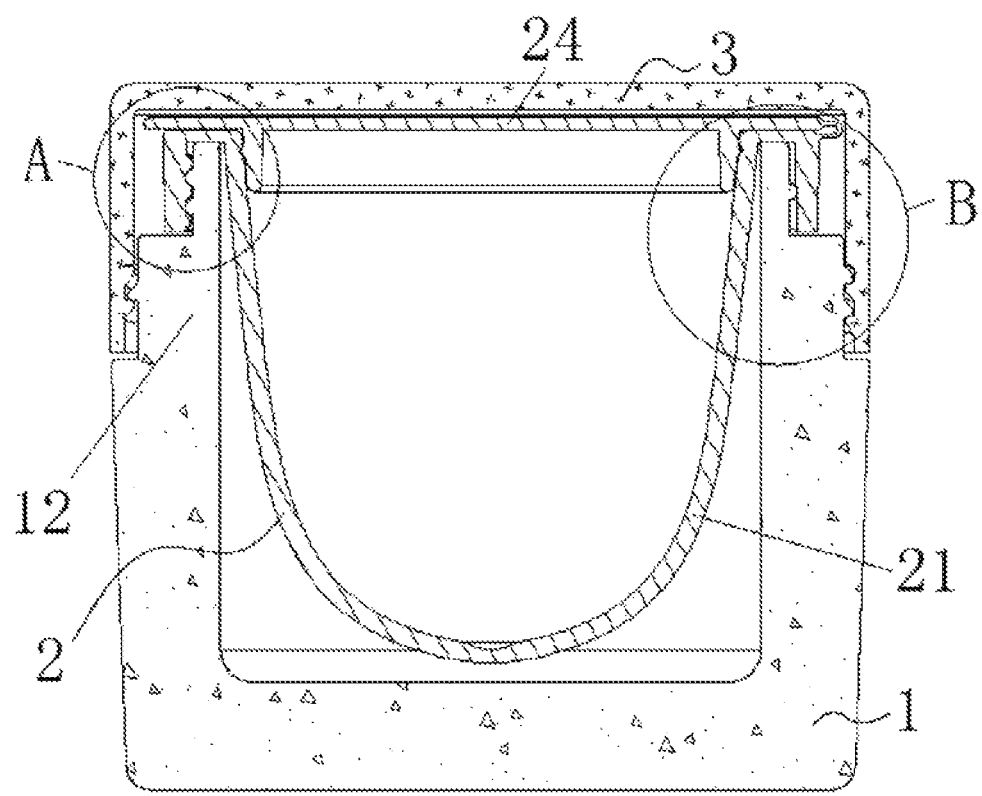
FIG. 3 is a structural schematic diagram of the present utility model.
Figure 4:
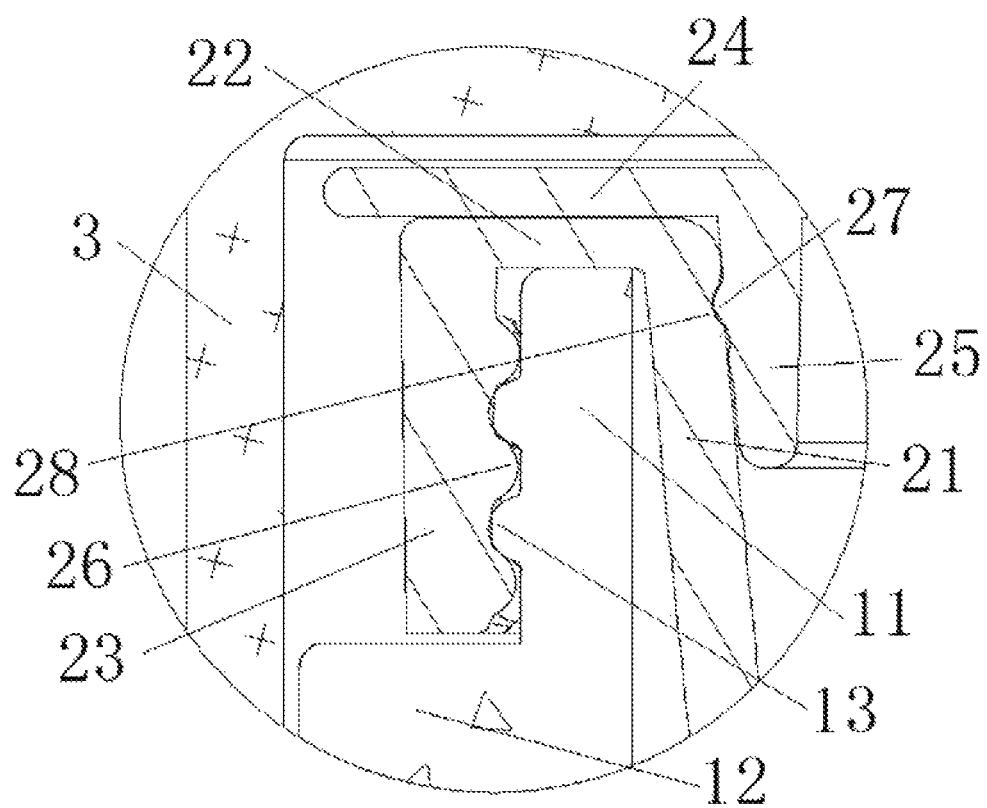
FIG. 4 is an enlarged view of a portion A in FIG. 3.
Figure 5:
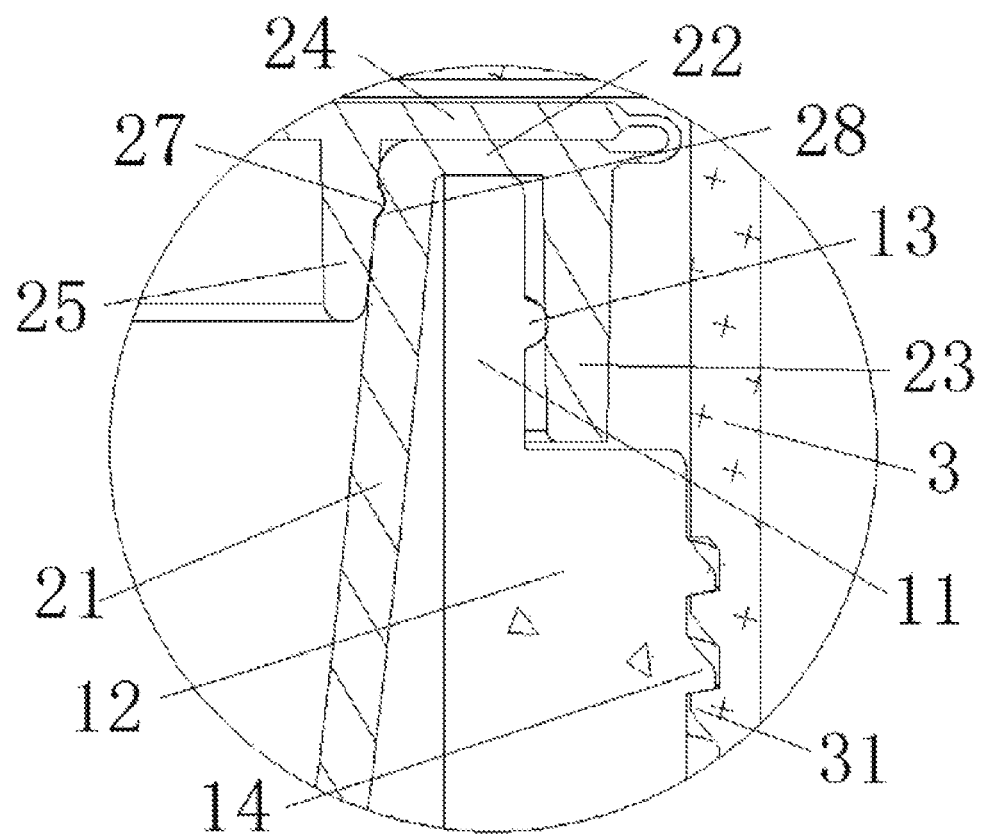
FIG. 5 is an enlarged view of a portion B in FIG. 3.

As show in FIGS. 1 to 5, a replaceable cosmetic bottle, comprising an outer bottle 1, an inner container 2 and a bottle cap 3, wherein the outer bottle 1 comprises a first threaded connection portion 11 and a second threaded connection portion 12 which are disposed on an upper portion of the outer bottle 1, with the outer diameter of the first threaded connection portion 11 being less than that of the second threaded connection portion 12, that is, a step structure is formed between the first threaded connection portion 11 and the second threaded connection portion 12.

The second threaded connection portion 12 is in threaded connection with the bottle cap 3, the inner container 2 comprises a vertical ring boss 23, the vertical ring boss 23 is in threaded connection with the first threaded connection portion 11, and the inner container 2 is fitted to the bottle cap 3 to enclose the outer bottle 1.

The outer bottle 1 is in threaded connection with the bottle cap 3 in such a specific manner that an inner annular wall of a lower portion of the bottle cap 3 is provided with a bottle cap inner screw thread 31, and an outer annular wall of the second threaded connection portion 12 is provided with a second outer screw thread 14 that is fitted in threaded connection with the bottle cap inner screw thread 31.

The inner container 2 is in threaded connection with the bottle cap 3 in such a specific manner that an inner annular wall of the vertical ring boss 23 is provided with a ring boss inner screw thread 26, and an outer annular wall of the first screw connection portion 11 is provided with a first outer screw thread 13 that is fitted in threaded connection with the ring boss inner screw thread 26. When the inner container 2 is mounted, all that is needed is to screw the inner container 2 into the outer bottle 1, which is simply and convenient for assembly and disassembly, realizing replacement of the inner container 2.

The inner container 2 further comprises a main accommodation body 21 for holding a cosmetic, a horizontal ring boss 22 formed by horizontally extending outward from an upper end of the main accommodation body 21, and a flip cap 24 integrally formed with the main accommodation body 21 for covering the main accommodation body 21, with an outer edge of the horizontal ring boss 22 vertically extending downward to form a vertical ring boss 23. The first threaded connection portion 11 extends between an upper portion of the main accommodation body 21 and the vertical ring boss 23, and the first threaded connection portion 11 vertically abuts against the horizontal ring boss 22.

The flip cap 24 is connected to one side of the horizontal ring boss 22.

The middle of one end surface of the flip cap 24 is provided with a convex ring 25, convex retainers 27 are circumferentially and uniformly distributed on an outer annular wall of the convex ring 25, an inner wall of an upper portion of the main accommodation body 21 is recessed to form a retainer ring slot 28, and the flip cap 24 is turned over such that the convex retainers 27 are fitted and retained into the retainer ring slot 28. The flip cap 24 has the effect of sealing the main accommodation body 21, and covering with the bottle cap 3 further ensures the sealing effect of the inner container 2.

The above embodiment is merely a preferred embodiment of the present utility model but not intended to limit the present utility model, and any modifications, equivalent replacements, improvements, etc. made within the spirit and principles of the present utility model should be included within the scope of protection of the present utility model.

What is claimed is:

1. A replaceable cosmetic bottle, comprising an outer bottle (1), an inner container (2) detachably connected to the outer bottle (1), and a bottle cap (3), wherein the outer bottle (1) comprises a first threaded connection portion (11) and a second threaded connection portion (12) which are disposed on an upper portion of the outer bottle (1), with the outer diameter of the first threaded connection portion (11) being less than that of the second threaded connection portion (12); the second threaded connection portion (12) is in threaded connection with the bottle cap (3); the inner container (2) comprises a vertical ring boss (23), and the vertical ring boss (23) is in threaded connection with the first threaded connection portion (11); the outer bottle (1) is fitted to the bottle cap (3) to enclose the inner container (2); wherein the inner container (2) further comprises a main accommodation body (21) for holding a cosmetic, a horizontal ring boss (22) formed by horizontally extending outward from an upper end of the main accommodation body (21), and a flip cap (24) integrally formed with the main accommodation body (21) for covering the main accommodation body (21), with an outer edge of the horizontal ring boss (22) vertically extending downward to form a vertical ring boss (23); wherein the middle of one end surface of the flip cap (24) is provided with a convex ring (25), convex retainers (27) are circumferentially and uniformly distributed on an outer annular wall of the convex ring (25), an inner wall of an upper portion of the main accommodation body (21) is recessed to form a retainer ring slot (28), and the flip cap (24) is turned over such that the convex retainers (27) are fitted and retained into the retainer ring slot (28).

2. The replaceable cosmetic bottle of claim 1, wherein an inner annular wall of a lower portion of the bottle cap (3) is provided with a bottle cap inner screw thread (31), and an outer annular wall of the second threaded connection portion (12) is provided with a second outer screw thread (14) that is fitted in threaded connection with the bottle cap inner screw thread (31).

3. The replaceable cosmetic bottle of claim 1, wherein the flip cap (24) is connected to one side of the horizontal ring boss (22).

4. The replaceable cosmetic bottle of claim 1, wherein an inner annular wall of the vertical ring boss (23) is provided with a ring boss inner screw thread (26), and an outer annular wall of the first threaded connection portion (11) is provided with a first outer screw thread (13) that is fitted in threaded connection with the ring boss inner screw thread (26).

* * * * *